United States Patent
Pichot et al.

(10) Patent No.: US 7,460,289 B2
(45) Date of Patent: Dec. 2, 2008

(54) ELECTROCHROMIC DISPLAY DEVICE

(76) Inventors: Francois Pichot, 55, Ballytore Road, Rathfarnham Road, Dublin 14 (IE); Colm McAtamney, Baltrasna, Ashbourne, County Meath (IE); Udo Bach, Staufenstrasse 18, 78247 Hilzingen (DE)

(*) Notice: Subject to any disclaimer, the term of this patent is extended or adjusted under 35 U.S.C. 154(b) by 148 days.

(21) Appl. No.: 10/543,527

(22) PCT Filed: Jan. 30, 2004

(86) PCT No.: PCT/IE2004/000014

§ 371 (c)(1),
(2), (4) Date: Jul. 27, 2005

(87) PCT Pub. No.: WO2004/068231

PCT Pub. Date: Aug. 12, 2004

(65) Prior Publication Data

US 2006/0132885 A1    Jun. 22, 2006

(30) Foreign Application Priority Data

Jan. 31, 2003  (EP) ................. 03394011

(51) Int. Cl.
G02F 1/15     (2006.01)
G02F 1/155    (2006.01)
G02F 1/153    (2006.01)
G02B 26/00    (2006.01)

(52) U.S. Cl. .............. 359/265; 359/266; 359/267; 359/269; 359/273; 359/295

(58) Field of Classification Search ......... 359/265–275, 359/237, 290, 291, 26, 292, 295
See application file for complete search history.

(56) References Cited

U.S. PATENT DOCUMENTS 4,193,670 A * 3/1980 Giglia et al. ................. 359/274
5,189,549 A   2/1993 Leventis et al.

(Continued)

FOREIGN PATENT DOCUMENTS

EP    1 244 168 A1    9/2002

(Continued)

OTHER PUBLICATIONS

XP-002239106: Bonhôte, P., et al., "Nanocrystalline Electrochromic Displays", *Displays*, vol. 20, No. 3, pp. 137-144, (1999).

(Continued)

*Primary Examiner*—Ricky Mack
*Assistant Examiner*—Brandi N Thomas
(74) *Attorney, Agent, or Firm*—Morgan Lewis & Bockius LLP

(57) ABSTRACT

The invention concerns an electrochromic device comprising a single supporting substrate (1) on which are disposed a working electrode (6) which is electrochromic per se and/or bears an electrochromic material on at least a portion thereof; a counter electrode (3); and a layer of an electrically insulating material (4) separating the electrodes; wherein said electrochromic material has a major surface at least a portion of which forms at least a portion of an external surface of the device. The new device allows deposition of electrochromic coatings on a variety of substrates which need not be transparent.

26 Claims, 2 Drawing Sheets

U.S. PATENT DOCUMENTS

| | | | |
|---|---|---|---|
| 5,923,457 A * | 7/1999 | Byker et al. | 359/271 |
| 6,094,292 A * | 7/2000 | Goldner et al. | 359/265 |
| 6,194,072 B1 * | 2/2001 | Hambitzer et al. | 428/411.1 |
| 2002/0171081 A1 | 11/2002 | Vincent et al. | |
| 2002/0181068 A1 * | 12/2002 | Bonhote et al. | 359/265 |
| 2003/0016202 A1 * | 1/2003 | Edwards et al. | 345/98 |
| 2003/0137521 A1 * | 7/2003 | Zehner et al. | 345/589 |

FOREIGN PATENT DOCUMENTS

| | | | |
|---|---|---|---|
| JP | 360084531 A * | 5/1985 | |

OTHER PUBLICATIONS

XP-001074184: Bach, U., et al., "Nanomaterials-Based Electrochromics For Paper-Quality Dispalys", *Adv. Mater.*, vol. 14, No. 11, pp. 845-848, (2002).

XP-002239105: Cummins, D., et al., "Ultrafast Electrochromic Windows Based On Redox-Chromophore Modified Nanostructured Semiconducting And Conducting Films", *J. Phys. Chem B*, vol. 104, No. 48, pp. 11449-11459, (2000).

XP-004309892: De Paoli, M.A., et al., "All Polymeric Electrochromic And Photoelectrochemical Devices: New Advances", *Electrochimica Acta*, vol. 46, No. 26-27, pp. 4243-4249, (2001).

De Paoli et al., All-Polymeric Electrochomic and Photoelectrochemical Devices: New Advances, Electrochimica Acta 46 (2001) 4243-4249.

Bach et al., Nanomaterials-Based Electrochromics for Paper-Quality Displays, Adv. Mater. 2002, 14, No. 11, Jun. 5.

* cited by examiner

ELECTROCHROMIC DISPLAY DEVICE

BACKGROUND OF THE INVENTION

This invention relates to an electrochromic device. In particular, it relates to an electrochromic device in which the components are built up on a single substrate which need not be transparent. Such devices are often referred to as monolithic devices.

Electrochromic systems are based on color changes that are caused by electrochemical reactions in various types of metal oxides or organic or inorganic compounds. Electrochromic devices are well known in the art. A typical electrochromic device architecture is the sandwich type architecture, which in its simplest form consists of two glass substrates on the outside and between them a counter and working electrode, an electrochromic material and an electrolyte which allows for the passage of ions. Such a device is disclosed in e.g. EP-A-1244168; Bach, U. et al, Adv. Mater. 2002, 14,No. 11, June 5and Cummins et al, J. Phys. Chem B 2000, 104, 11449-11459. One disadvantage of the sandwich type-architecture is that the electrochromic layer is typically viewed through a transparent substrate, such as glass which is covered with a transparent conducting layer. Transmission values for such conducting transparent substrates, e.g. glass or plastic coated with an electrically conducting material, are typically in the region of 70-90%. In reflective display applications, the light must pass through this layer twice when being diffusely reflected. This results in transmission losses of 19-51%, thereby limiting the maximum diffuse reflectance in the "off" state of the device to 49-81%.

WO-A-97/16838 discloses a monolithic device for solar cell applications. This device has a "classic" monolithic architecture, i.e. the working electrode layer is deposited directly onto a transparent conducting supporting substrate and is therefore the bottom layer of the device.

WO-A-01/97237 also discloses a monolithic device having a "classic" monolithic architecture where the working electrode (photoelectrode) is deposited directly onto a transparent conducting supporting substrate.

A major disadvantage of the existing monolithic devices is that they only allow deposition of electrochromic coatings onto transparent substrates, thus limiting their applications. Furthermore, pixels must be viewed through at least two layers of material, thereby adversely affecting the reflectance of the conventional devices.

It is an object of the present invention to avoid or minimize the disadvantages of the prior art.

SUMMARY OF THE INVENTION

According to the invention there is provided an electrochromic device comprising a single supporting substrate on which are disposed:

(a) a working electrode comprising a porous layer of an electrically conducting or semiconducting material, the working electrode comprising material which is electrochromic per se and/or at least a portion of said working electrode bearing electrochromic material;
(b) a counter electrode comprising a porous layer of an electrically conducting or semiconducting material;
(c) a layer of an electrically insulating material which is ion-permeable and which separates the working electrode and the counter electrode layers;
   wherein said electrochromic material has a major surface at least a portion of which forms at least a portion of an external surface of the device.

BRIEF DESCRIPTION OF THE DRAWINGS

In the accompanying drawings.

DETAILED DESCRIPTION OF THE INVENTION

Figure 1:
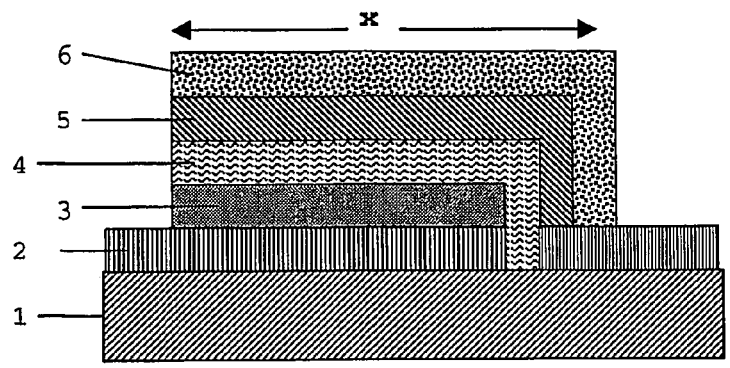
FIG. 1 is a cross sectional diagram of one embodiment of a monolithic device according to the invention.

As used herein, the term "electrochromic material" is intended to refer to a material which changes color on the application of an electrical potential thereto.

In the device of the invention, substantially all of the major surface of the electrochromic material may form a portion of the external surface of the device. The working electrode preferably has a major surface which may be electrochromic per se or may bear electrochromic material on at least a portion thereof. The electrochromic material may substantially cover the major surface of the working electrode. The working electrode, counter electrode and insulating layers may be substantially parallel along their length. These layers may also be substantially coextensive with one another.

The supporting substrate may be formed from any suitable transparent or non-transparent material, such as glass or metal or a ceramic or plastics material. The substrate may be rendered electrically conducting by applying an electrically conducting coating to at least a portion of the internal surface thereof. The electrically conducting coating preferably comprises a doped metal oxide, such as, for example, tin oxide doped with fluorine or antimony, or indium oxide doped with tin, or a conducting polymer or metal. However, if the intrinsic sheet resistance of the material of the working electrode and/or the counter electrode is less than 10,000 ohms per square, the application of an electrically conducting coating to the substrate may not be required.

The working electrode may be arranged so that at least a portion thereof is laterally offset from the counter electrode.

The working and counter electrodes comprise an electrically conducting or semiconducting material. A preferred electrically conducting material of the working and/or counter electrodes comprises nanoparticles of a metal oxide selected from any of the following:

(a) $SnO_2$ doped with F, Cl, Sb, P As or B;
(b) ZnO doped with Al, In, Ga, B, F, Si, Ge, Ti, Zr or Hf;
(c) $In_2O_3$ doped with Sn;
(d) CdO;
(e) $ZnSnO_3$, $Zn_2In_2O_5$, $In_4Sn_3O_{12}$, $GaInO_3$ or $MgIn_2O_4$;
(f) $Fe_2O_3$ doped with Sb;
(g) $TiO_2/WO_3$ or $TiO_2/MoO_3$ systems; and
(h) $Fe_2O_3/Sb$ or $SnO_2/Sb$ systems;

preferably $SnO_2$ doped with Sb.

A preferred electrically semiconducting material of the working and/or counter electrodes comprises nanoparticles of a metal oxide selected from any of the following:

$TiO_2$, $ZrO_2$, $HfO_2$, $CrO_3$, $MoO_3$, $WO_3$, $V_2O_3$, $V_2O_5$, $Nb_2O_5$, $SnO_2$, $Ta_2O_5$, AgO, $Ag_2O$, ZnO, SrO, FeO, $Fe_2O_3$ or NiO, or a perovskite thereof, more preferably $TiO_2$, $WO_3$, $MoO_3$, ZnO or $SnO_2$.

When the conducting or semiconducting material of the working electrode is electrochromic per se, such a material may include metal or doped metal oxides. Examples of such oxides include $WO_3$, $TiO_2$, antimony doped tin oxide (ATO), fluorine doped tin oxide (FTO) and tin doped indium oxide (ITO). Alternatively and preferably, when the conducting or semiconducting material of the working electrode, which may or may not have intrinsic electrochromic properties, bears an electrochromic material, such electrochromic material is preferably selected from viologens and polymers and mixtures thereof. Suitable viologens are disclosed in WO-A-98/35267, WO-A-01/27690, WO-A-03/001288 and a copending PCT Application entitled "Electrochromic Compounds", filed on even date by the Applicant (NTera Limited). Suitable polymers include polythiophenes, polypyrroles and polyviologens.

The electrically insulating layer is preferably transparent or light-scattering and may comprise organic or inorganic material. This layer may also be porous. Such a porous layer preferably comprises a metal oxide selected from $SiO_2$, $Al_2O_3$, ZrO and MgO, or $TiO_2$ in the rutile form passivated with $SiO_2$.

The inventive device may additionally comprise an ion-conducting medium. In one embodiment, the electrically insulating layer of the device may comprise an ion-conducting medium. For example, polyethylene glycol could serve as both insulator and solid electrolyte. In another embodiment, the ion-conducting medium may be present in the device as an additional layer of solid electrolyte. In a preferred embodiment, the electrically insulating layer is porous, each of the porous layers is at least partially sealed, and the ion-conducting medium comprises a liquid electrolyte which at least partially fills the pores of the electrodes and the insulating material. The device of the invention preferably also comprises a transparent cover or top layer at least partially exposing the electrochromic material and a sealing material sealing the cover to the electrochromic device. Preferably, the sealing material seals the cover to the supporting substrate.

The liquid electrolyte, when present, preferably comprises at least one electrochemically inert salt optionally in molten form or in solution in a solvent. Examples of suitable salts include hexafluorophosphate, bis-trifluoromethanesulfonate, bis-trifluoromethylsulfonylimide, tetraalkylammonium, dialkyl-1,3-imidazolium and lithium perchlorate. Examples of suitable molten salts include trifluoromethanesulfonate, 1-ethyl, 3-methyl imidazolium bis-trifluoromethylsulfonylimide and 1-propyldimethyl imidazolium bis-trifluoromethylsulfonylimide. Lithium perchlorate is particularly preferred.

The solvent may be any suitable solvent and is preferably selected from acetonitrile, butyronitrile, glutaronitrile, dimethylsulfoxide, dimethylformamide, dimethylacetamide, N-methyloxazolidinone, dimethyltetrahydropyrimidinone, γ-butyrolactone and mixtures thereof. Lithium perchlorate in γ-butyrolactone is particularly preferred.

The device of the invention may optionally comprise an electrical current supporting layer interposed between the (semi) conducting material of the working electrode and the electrically insulating material. The electrical current supporting layer is formed from a porous, electrically conducting material which enables the transport of charge between the device components. This layer may suitably comprise indium oxide doped with tin or tin oxide doped with fluorine, or conducting polymers such as polythiophenes, polypyrroles and polyviologens.

The device of the invention may be conveniently sealed using a suitable sealing material and a transparent cover of glass or a plastics material disposed on the external surface of the layer remote from the supporting substrate.

The invention also provides a display comprising one or more devices according to the invention. A plurality of devices according to the invention may also be connected in series, forming an assembly. The device/assembly of the invention may be used in an active matrix or passive matrix or in direct drive configurations.

Figure 2:
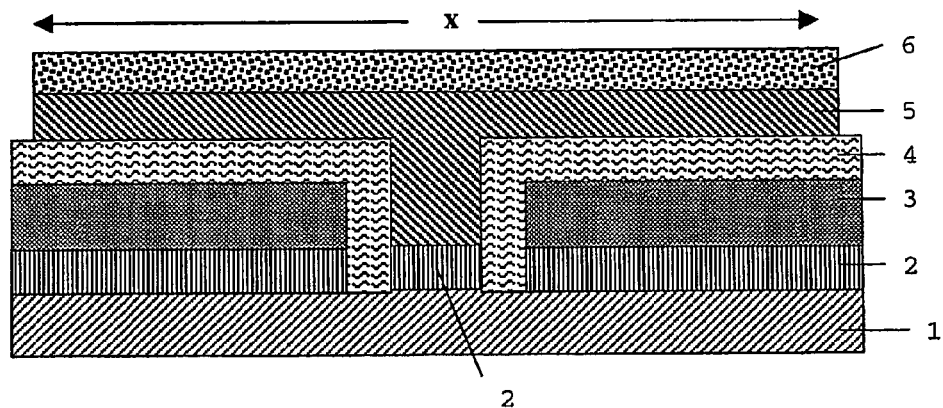
FIG. 2 is a cross sectional diagram of another embodiment of a monolithic device according to the invention.
Figure 3:
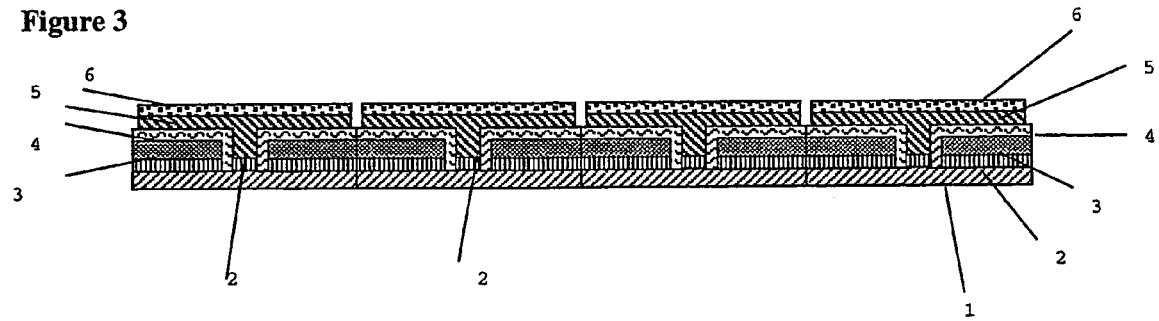
FIG. 3 shows a plurality of the devices of FIG. 2 connected in series.

In the accompanying drawings, FIG. 1 is a cross sectional diagram of one embodiment of a monolithic device according to the invention; FIG. 2 is a cross sectional diagram of another embodiment of a monolithic device according to the invention; FIG. 3 shows a plurality of the devices of FIG. 2 connected in series; and FIGS. 4A and 4B are photographs of a top plan view of the device of FIG. 2 containing three independent electrochromic pixels.

Referring to the drawings, in which like numerals represent like parts, the device of FIG. 1 comprises a supporting substrate 1, which may be glass, plastic, ceramic or other suitable material. The substrate 1 bears a conducting coating or layer 2 that provides contact for a display device to external electronic controls. This layer 2 is patterned to allow for individual contact to pixels in a display and also for individual contact to working and counter electrode layers 6 and 3, respectively. The counter electrode layer 3 comprises a material porous to ions and is electrically conducting. Layer 3 is physically in contact with layer 2 and electrical current can flow between these layers. The working and counter electrodes are separated by a porous insulating layer 4. Layer 4 is porous to ions and is electrically insulating. The layer 4 is physically deposited on top of the counter electrode layer 3 and provides insulation for subsequent layers which must not be in contact with layer 3. An ion porous, electrically conducting layer 5 is physically deposited on layer 4 and is in electrical contact with layer 2. Layer 5 provides efficient electrical charge conduction to the working electrode layer/electrochromic layer 6. The major surface of the layer 6, i.e. the viewing surface, is denoted by x.

The device of FIG. 2 is the same as that of FIG. 1 except that the insulating layer 4 includes a via hole that allows contact between layer 2 and layer 5 such that electrical charge may be directed to the pixel. The electrically conducting layer 5 is physically deposited on layer 4 and is in electrical contact with layer 2 by filling in the via hole.

Figure 4A:
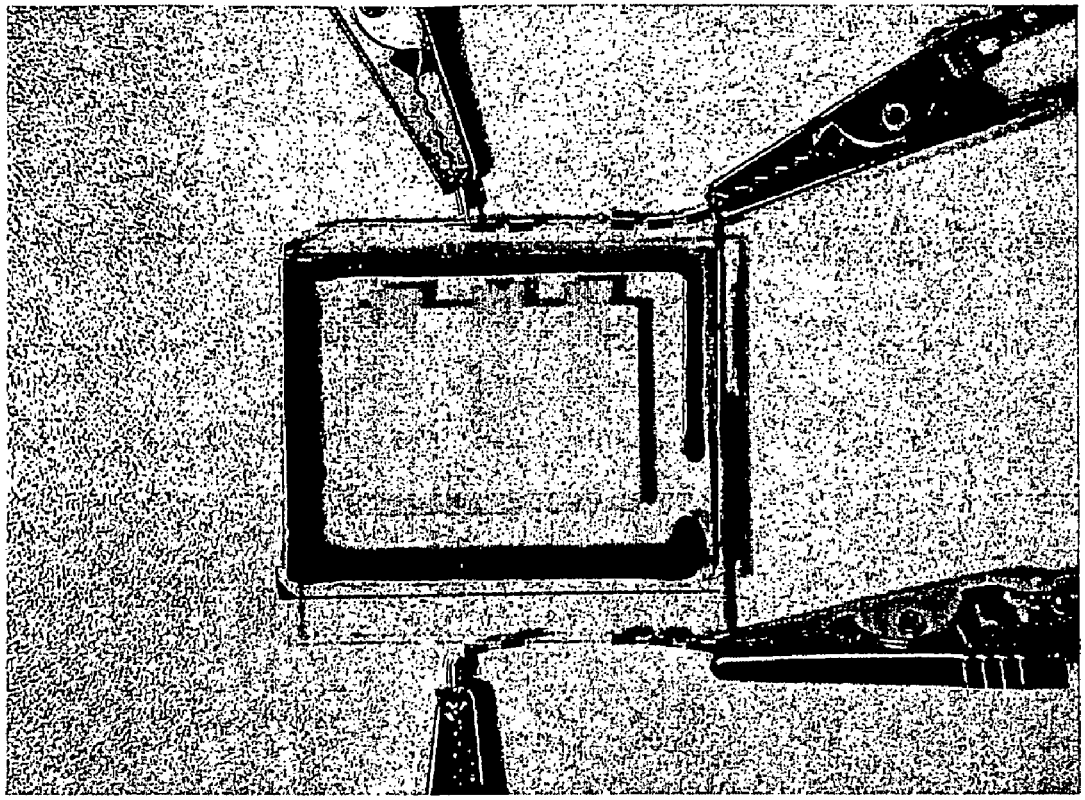
FIGS. 4A and 4B are photographs of a top plan view of the device of FIG. 2 containing three independent electrochromic pixels.
Figure 4B:
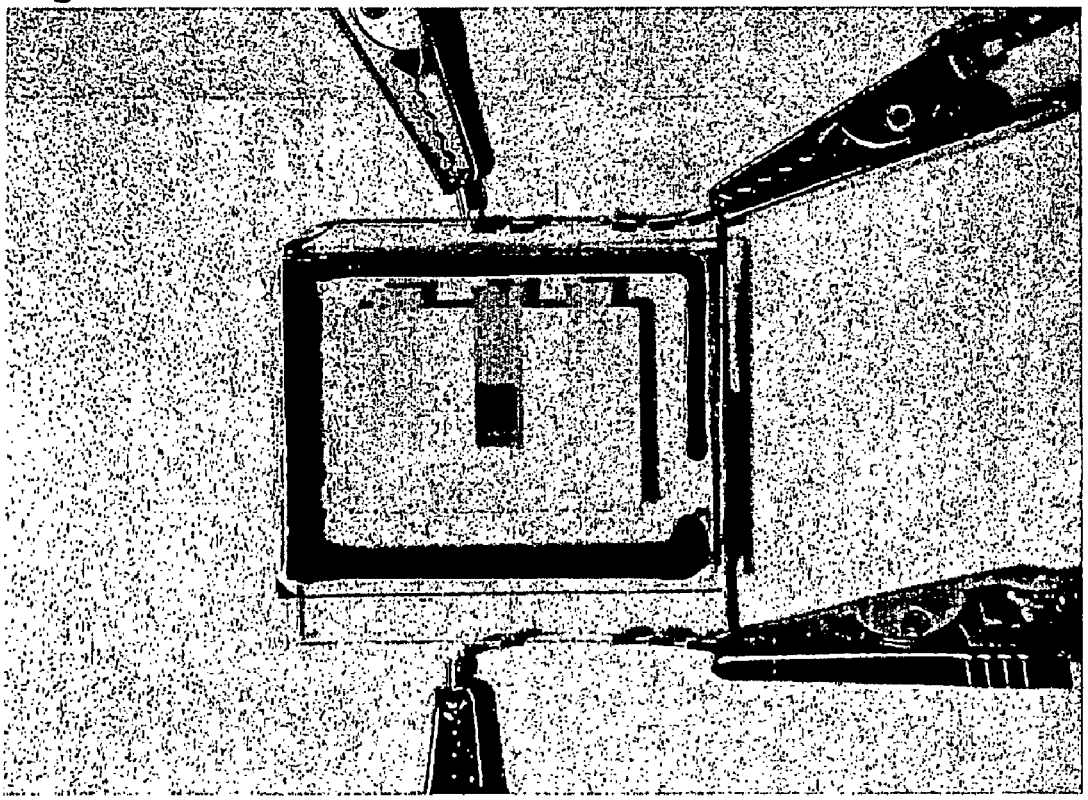

In FIGS. 4A and 4B, the device is viewed through a layer of plain glass which is disposed on the external (viewing) surface of the layer 6 and sealed to the supporting substrate of the device. The seal of the device is visible as a black square. The space between the top glass plate and the substrate contains liquid electrolyte. FIG. 4A shows all three pixels in the off-state (0 volt bias), while in FIG. 4B the middle pixel was switched on by applying a negative bias of 1.5 V to the working electrode relative to its underlying counter electrode (not visible).

The electrochromic device of the invention has a number of advantages over existing devices:

It allows deposition of electrochromic coatings on a variety of substrates.

The supporting substrate does not need to be transparent.

High reflectivities in the high-reflectance state (off-state) can be reached.

The new architecture makes it easy to integrate the device onto circuit boards or other substrates, which already carry other electronic components. If the device is used as a display, it provides a very simple way of 'wiring' it to other display components (located on the same circuit board).

There is no loss of reflectivity in reflective displays.

The invention is illustrated in the following Example.

EXAMPLE

A supporting substrate in the form of glass coated with tin doped indium oxide (ITO) was patterned according to standard wet-etching techniques. Using screen-printing techniques the following layers were deposited on the substrate in the following sequence:

a) Sb-doped $SnO_2$—(nanostructured; microparticles+binder+solvent paste)
b) $SiO_2$-passivated rutile (microparticles+binder+solvent paste);
c) ITO (nano- to microparticles+binder+solvent paste); and
d) $TiO_2$ (nanoparticles+polymer+binder paste).

The binder used in each of the above steps (a)-(d) was hydroxypropyl cellulose (Klucel EXF PHARM); and the solvent was terpineol (anhydrous, Fluka).

The electrically insulating layer (b) was prepared using the materials listed below according to the procedure described by Kay et al. in Solar Energy Materials and Solar Cells (1996), 44(1), pp 99-117.

Materials

Inorganic pigment: Rutile $TiO_2$; Ti-Pure Rutile R706 by DuPont. Median particle size: 0.36 μm, 3.0% $SiO_2$ & organic treatment.

Binder: Hydroxypropyl cellulose (HPC); Klucel EXF PHARM.

Solvent: Terpineol; anhydrous, purum, mixture of isomers, Fluka ordering number 86480.

The layered structure was sintered at 450° C. for 30 minutes, exposed to a solution of bis-(2-phosphonoethyl)-4,4'-bipyridinium dichloride in water, rinsed, dried and sealed using an epoxy sealing ring and a top glass cover. The device was backfilled with the electrolyte lithium perchlorate in gamma-butyrolactone.

The Sb-doped $SnO_2$ layer is used as a counter electrode, which can store or release charge and is necessary to show the electrochromic effect of the electrochromic layer. The rutile layer electrically insulates the doped $SnO_2$ layer from the electrochromic layer and provides a 'white background' for the device. Ionic movement through this layer is facilitated due to its porous structure. The ITO layer is used as an electrical current supporting layer. It appears opaque (nearly white). Ionic movement through this layer is facilitated due to its porous structure. Its sheet resistance is lower than 1 kΩ/□.

The viologen-derivatised mesoporous $TiO_2$ layer is used as electrochromic layer.

The invention claimed is:

1. An electrochromic device comprising a single supporting substrate on which are disposed:
(a) a working electrode comprising a porous layer of an electrically conducting or semiconducting material, the working electrode comprising material which is electrochromic per se and/or at least a portion of said working electrode bearing electrochromic material;
(b) a counter electrode comprising a porous layer of an electrically conducting or semiconducting material, wherein said counter electrode does not have physical contact with said working electrode;
(c) a layer of an electrically insulating material which is ion-permeable and which separates the working electrode and the counter electrode layers; and
(d) an ion porous electrical current supporting layer interposed between the working electrode and the electrically insulating layers;

wherein said electrochromic material has a major surface at least a portion of which forms at least a portion of an external surface of the device.

2. A device according to claim 1, wherein substantially all of said major surface forms a portion of the external surface of the device.

3. A device according to claim 1, wherein said working electrode has a major surface which is electrochromic per se.

4. A device according to claim 1, wherein said working electrode has a major surface at least a portion of which bears electrochromic material.

5. A device according to claim 4, wherein said electrochromic material substantially covers said major surface of said working electrode.

6. A device according to claim 1, wherein the working electrode, counter electrode and insulating layers are substantially parallel; and/or wherein the working electrode, counter electrode and insulating layers are substantially coextensive with one another.

7. A device according to claim 1, wherein at least a portion of the working electrode is laterally offset from the counter electrode.

8. A device according to claim 1, wherein the supporting substrate is formed from a transparent or non-transparent material.

9. A device according to claim 8, wherein the substrate is formed from glass or metal or a ceramic or plastics material.

10. A device according to claim 8, wherein the supporting substrate bears an electrically conducting coating on at least a portion of the internal surface thereof.

11. A device according to claim 10, wherein the electrically conducting coating comprises a doped metal oxide, preferably tin oxide doped with fluorine or antimony, or indium oxide doped with tin, or a conducting polymer or metal.

12. A device according to claim 1, wherein the intrinsic sheet resistance of the material of the working electrode and/or the counter electrode is less than 10,000 ohms per square.

13. A device according to claim 1, wherein the working and/or counter electrodes comprise an electrically conducting material comprising nanoparticles of a metal oxide selected from any of the following: (a) $SnO_2$ doped with F, Cl, Sb, P, As or B; (b) ZnO doped with Al, In, Ga, B, F, Si, Ge, Ti, Zr or Hf; (c) $In_2O_3$ doped with Sn; (d) CdO; (e) $ZnSnO_3$, $Zn_2In_2O_5$, $In_4Sn_3O_{12}$, $GaInO_3$ or $MgIn_2O_4$; (f) $Fe_2O_3$ doped with Sb; (g) $TiO_2/WO_3$ or $TiO_2/MoO_3$ systems; and (h) $Fe_2O_3/Sb$ or $SnO_2/Sb$ systems; preferably $SnO_2$ doped with Sb.

14. A device according to claim 1, wherein the working and/or counter electrode comprise an electrically semiconducting material comprising nanoparticles of a metal oxide selected from any of the following:

$TiO_2$, $ZrO_2$, $HfD_2$, $CrO_3$, MoO, $WO_3$, VO, NbO, $SnO_2$, TaO, AgO, ZnO, SrO, FeO, $Fe_2O_3$ or NiO, or a parasite thereof, preferably $TiO_2$, $WO_3$, $MoO_3$, ZnO or $SnO_2$.

15. A device according to claim 3, wherein the electrochromic material of the working electrode is a metal oxide selected from $WO_3$ and $TiO_2$ or a doped metal oxide selected from antimony or fluorine doped tin oxide and tin doped indium oxide.

16. A device according to claim 4, wherein the electrochromic material is selected from viologens and polymers and mixtures thereof.

17. A device according to claim 1, further comprising an ion-conducting medium.

18. A device according to claim 1, wherein the electrically insulating layer comprises an ion-conducting medium.

19. A device according to claim 1, wherein the electrically insulating material is porous and each of the porous layers is at least partially sealed, and the ion-conducting medium comprises a liquid electrolyte which at least partially fills the pores of the electrodes and the insulating material.

20. A device according to claim 1, further comprising a transparent cover at least partially exposing said electrochromic material and a sealing material sealing said cover to said electrochromic device.

21. A device according to claim 20, wherein said sealing material seals said cover to said supporting substrate.

22. A device according to claim 19, wherein the electrically insulating material comprises a metal oxide selected from $SiO_2$, $Al_2O_3$, ZrO and MgO, or $TiO_2$ in the rutile form passivated with $SiO_2$.

23. A device according to claim 1, wherein the electrical current supporting layer comprises indium oxide doped with tin or tin oxide doped with fluorine, or a conducting polymer selected from polythiophenes, polypyrroles and polyviologens.

24. A display comprising one or more devices according to claim 1.

25. A display according to claim 24, comprising a plurality of devices connected in series.

26. Use of a device according claim 1 in an active matrix or passive matrix or in direct drive configurations.

* * * * *